United States Patent
Tsutsumi et al.

(10) Patent No.: US 8,797,427 B2
(45) Date of Patent: Aug. 5, 2014

(54) IMAGE PROCESSING APPARATUS

(75) Inventors: Norihiko Tsutsumi, Yokohama (JP); Masafumi Sei, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 1029 days.

(21) Appl. No.: 12/694,819

(22) Filed: Jan. 27, 2010

(65) Prior Publication Data

US 2010/0231759 A1 Sep. 16, 2010

(30) Foreign Application Priority Data

Mar. 16, 2009 (JP) .................. 2009-63321

(51) Int. Cl.
*H04N 9/64* (2006.01)
*H04N 9/73* (2006.01)
*H04N 5/208* (2006.01)
*H04N 9/093* (2006.01)
*H04N 5/21* (2006.01)

(52) U.S. Cl.
USPC ........ 348/242; 348/223.1; 348/252; 348/263; 348/625

(58) Field of Classification Search
CPC ....... H04N 9/045; H04N 9/646; H04N 9/735; H04N 5/208; H04N 5/142
USPC ......... 348/242, 253, 256, 624, 675, 255, 530, 348/312, 597, 568, 127, 223.1, 252, 625; 345/604
See application file for complete search history.

(56) References Cited

U.S. PATENT DOCUMENTS

| 5,523,785 A * | 6/1996 | Muramoto ............... 348/254 |
| 2007/0109424 A1* | 5/2007 | Kohashi et al. ........... 348/223.1 |
| 2008/0273793 A1* | 11/2008 | Oishi ............................ 382/167 |

FOREIGN PATENT DOCUMENTS

| JP | 2003-101815 A | 4/2003 |
| JP | 2004-208038 A | 7/2004 |
| JP | 2006-333316 A | 12/2006 |

* cited by examiner

*Primary Examiner* — Twyler Haskins
*Assistant Examiner* — Quang Le
(74) *Attorney, Agent, or Firm* — Arent Fox LLP

(57) ABSTRACT

An image processing apparatus includes, a color correction unit performing color correction on RGB signals to generate color-corrected RGB signals; a YC conversion unit converting the color-corrected RGB signals into a first luminance signal and a color-difference signal; a Y conversion unit generating a second luminance signal based on the RGB signals; an edge combination unit combining the first luminance signal with the second luminance signal; an edge adjustment unit obtaining an edge-adjusted signal based on a result of the combining by the edge combination unit; and an adder adding the first luminance signal to the edge-adjusted signal.

18 Claims, 12 Drawing Sheets

IMAGE PROCESSING APPARATUS

CROSS-REFERENCE TO RELATED APPLICATIONS

This application is based upon and claims the benefit of priority from the prior Japanese Patent Application No. 2009-63321, filed on Mar. 16, 2009, the entire contents of which is incorporated herein by reference.

FIELD

The present invention relates to an image processing apparatus.

BACKGROUND

Recently, development has been conducted for further improving images of digital cameras. In order to make it easy to view images of digital cameras, a process for emphasizing an edge in a taken image is performed.

FIG. 1 illustrates an existing edge emphasis technology. RGB signals are subjected to a color correction process at a color correction unit 10. The RGB signals that have been subjected to the color correction process are subjected to a gamma correction process at a gamma correction unit 11. The RGB signals that have been subjected to the gamma correction process are converted into YCbCr signals at an YC conversion unit 12. This process is referred to as "YC conversion." A signal Y of the YCbCr signals is a luminance signal, and a signal Cb and a signal Cr of the YCbCr signals are color-difference signals. Edge detection is performed at an edge detection unit 13 for the luminance signal Y obtained after the YC conversion. After a detected edge component E is adjusted at an edge adjustment unit 14, an edge component Ead is added to a luminance signal Yn that has been noise-removed at a noise removal unit 15, thereby performing edge emphasis.

In the existing technology in FIG. 1, an edge is detected by using the luminance Y that is generated by performing YC conversion of RGB signals (Rc, Gc, and Bc) that have been subjected to a color correction process. Rc, Gc, and Bc are referred to as color-corrected RGB signals. In the color correction process, the following matrix operation is performed in order to match the color space of a camera with the color space of an output apparatus.

$$\begin{pmatrix} Rc \\ Gc \\ Bc \end{pmatrix} = \begin{pmatrix} CC00 & CC01 & CC02 \\ CC10 & CC11 & CC12 \\ CC20 & CC21 & CC22 \end{pmatrix} \begin{pmatrix} R \\ G \\ B \end{pmatrix}$$

Recently, digital cameras have poor color separation due to increases in pixels of imaging devices. Poor color separation means that in the spectral sensitivity characteristic of an imaging device, spectral sensitivity of R, G, and B is poor, green or blue is mixed in red, and an image may not be expressed in accurate color. For example, it is a phenomenon that when a red subject is photographed by an imaging device having a Bayer array, only red pixels normally should respond but green and blue pixels around the red pixels also respond together. Thus, when an image of an imaging device having poor color separation is processed, color correction is performed to a high degree in order to match the color space of a camera with the color space of an output apparatus.

Performing color correction "to a high degree" means that diagonal elements in a matrix that is a color correction matrix, for example, in a 3×3 matrix, are large. Performing color correction "to a low degree" means that the 3×3 matrix is close to a unit matrix. When color correction is performed to the lowest degree, the color correction matrix is a unit matrix. The color correction matrix is set such that the sum of matrix elements in a row direction becomes 1.

$CC00+CC01+CC02=1.0$ $CC10+CC11+CC12=1.0$ $CC20+CC21+CC22=1.0$

The following color correction matrix is one example where color correction is performed to a high degree. When diagonal elements in the color correction matrix are large, it means that color correction is performed to a high degree.

$$\begin{pmatrix} Rc \\ Gc \\ Bc \end{pmatrix} = \begin{pmatrix} 1.8 & -0.7 & -0.1 \\ -0.4 & 1.8 & -0.4 \\ -0.1 & -0.7 & 1.8 \end{pmatrix} \begin{pmatrix} R \\ G \\ B \end{pmatrix}$$

In the case of the existing technology in FIG. 1, the upper limit and the lower limit of RGB data obtained after color correction is performed to a high degree need to be subjected to a clip process such that values of the RGB data fit into a memory area prepared in advance for RGB data. For example, in the case where the memory area for RGB data is an unsigned 12-bit integer, when a value of the RGB data is greater than 4095, the value needs to be changed to 4095, and when a value of the RGB data is less than 0, the value needs to be changed to 0. Due to the clip process, a false outline that does not exist in the actual image may occur. In other words, due to the clip process, an image is provided, which changes sharply at a part where the original image changes smoothly, and hence the image is in a state as if an edge exists therein.

In the existing technology in FIG. 1, it is a problem to detect, as an edge, the false outline that is a kind of noise. Further, when color correction is performed to a high degree for RGB data in a color correction process, noise increases, and noise is mixed in a luminance component at gamma correction. Thus, noise of the luminance Y obtained after the YC conversion increases, which is a problem. As a result of the increase in the noise of the luminance Y, edge detection is easily affected by noise, and an unsmooth edge is generated in a process of emphasizing an edge, which is a problem.

FIGS. 2A and 2B illustrate another existing edge emphasis technology.

A process in FIG. 2A and a process in FIG. 2B cooperate to generate one image. A luminance Y is generated in the process in FIG. 2A, and color differences CbCr are generated in the process in FIG. 2B. In other words, the luminance signal Y is generated in the process in FIG. 2A, while RGB signals are color-corrected at a color correction unit 20, gamma-corrected at a gamma correction unit 21, and YC-converted at a YC conversion unit 22. Edge detection is performed at an edge detection unit 23 for the luminance signal Y, and a signal Ead that has been edge-adjusted at an edge adjustment unit 24 is added to a luminance signal Yn that has been noise-removed at a noise removal unit 25, thereby generating a luminance signal Yee. In the process in FIG. 2A, a unit matrix is used for a matrix operation for color correction. By so doing, color correction is not performed when the luminance signal Y is generated. As a result, an adverse effect due to noise does not occur.

In the process in FIG. 2B, in order to generate the color differences CbCr, color correction is performed to a relatively high degree in the color correction process. In other words, RGB signals that are the same as the RGB signals processed in FIG. 2A are color-corrected at the color correction unit 20 and gamma-corrected at the gamma correction unit 21, and the color-difference signals CbCr are generated at the YC conversion unit 22. Then, the luminance signal Yee obtained in the process in FIG. 2A and the color-difference signals CbCr obtained in the process in FIG. 2B are combined to obtain one image.

In the technology in FIGS. 2A and 2B, an adverse effect on a luminance signal due to noise may be suppressed, but two processes are needed to generate one image.

Further, because the unit matrix is used for the color correction in the process in FIG. 2A, luminance data becomes nonstandard, and color reproducibility is poor. Here, the luminance data becoming nonstandard means that the luminance data does not comply with the standards of the color space of an output apparatus because a color correction process for matching the color space of a camera with the color space of the output apparatus is not performed during a period of generating the luminance data.

SUMMARY

According to an aspect of the invention, an image processing apparatus includes a color correction unit performing color correction on RGB signals to generate color-corrected RGB signals; a YC conversion unit converting the color-corrected RGB signals into a first luminance signal and a color-difference signal; a Y conversion unit generating a second luminance signal based on the RGB signals; an edge combination unit combining the first luminance signal with the second luminance signal; an edge adjustment unit obtaining an edge-adjusted signal based on a result of the combining by the edge combination unit, and an adder adding the first luminance signal to the edge-adjusted signal.

An object and advantages of an embodiment of the invention will be realized and attained by elements and combinations of elements particularly pointed out in the claims. It is to be understood that both the foregoing general description and the following detailed description are explanatory and are not restrictive of the invention, as claimed.

DESCRIPTION OF EMBODIMENTS

Figure 1:
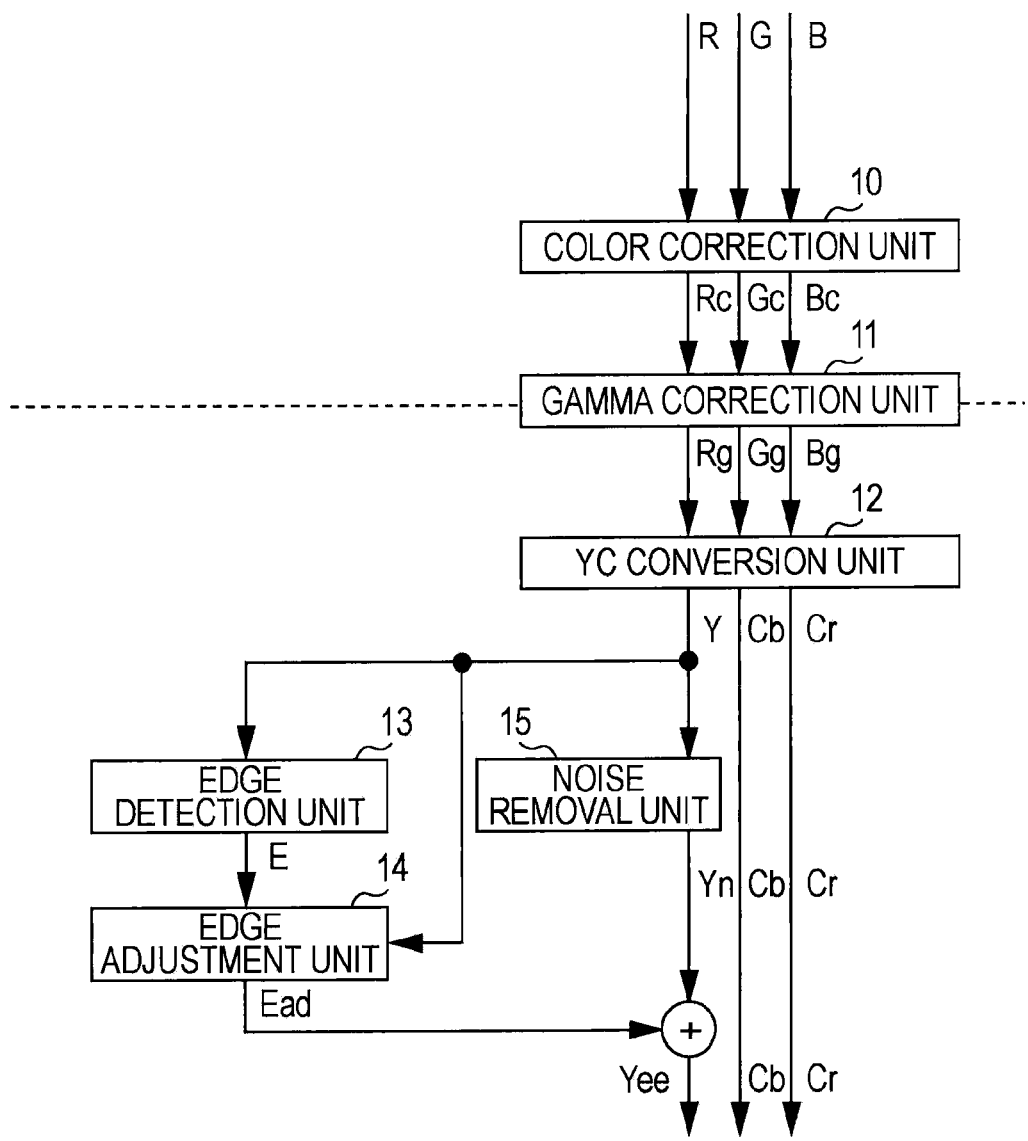
FIG. 1 illustrates a first related art.
Figure 2B:
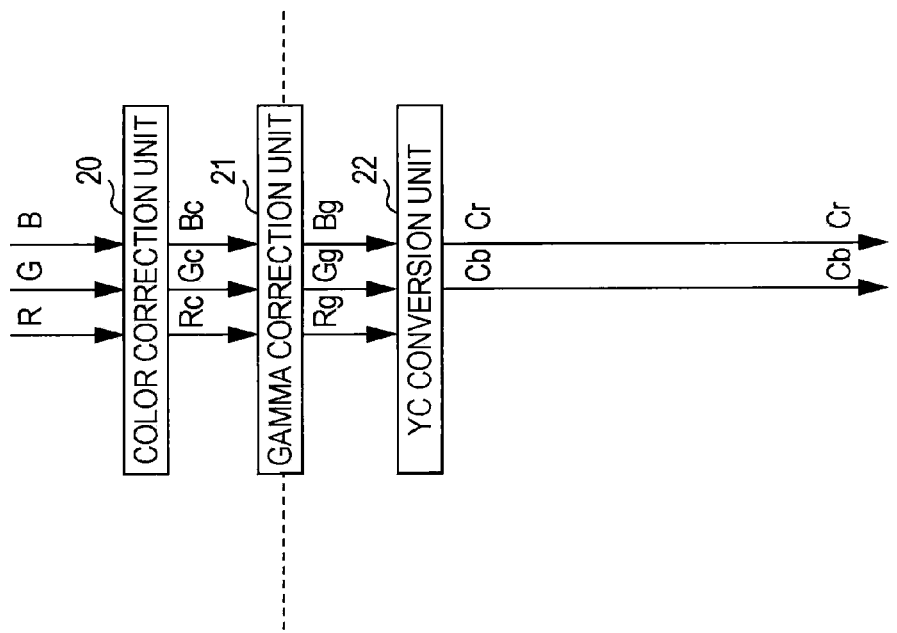
FIGS. 2A and 2B illustrate a second related art.
Figure 2A:
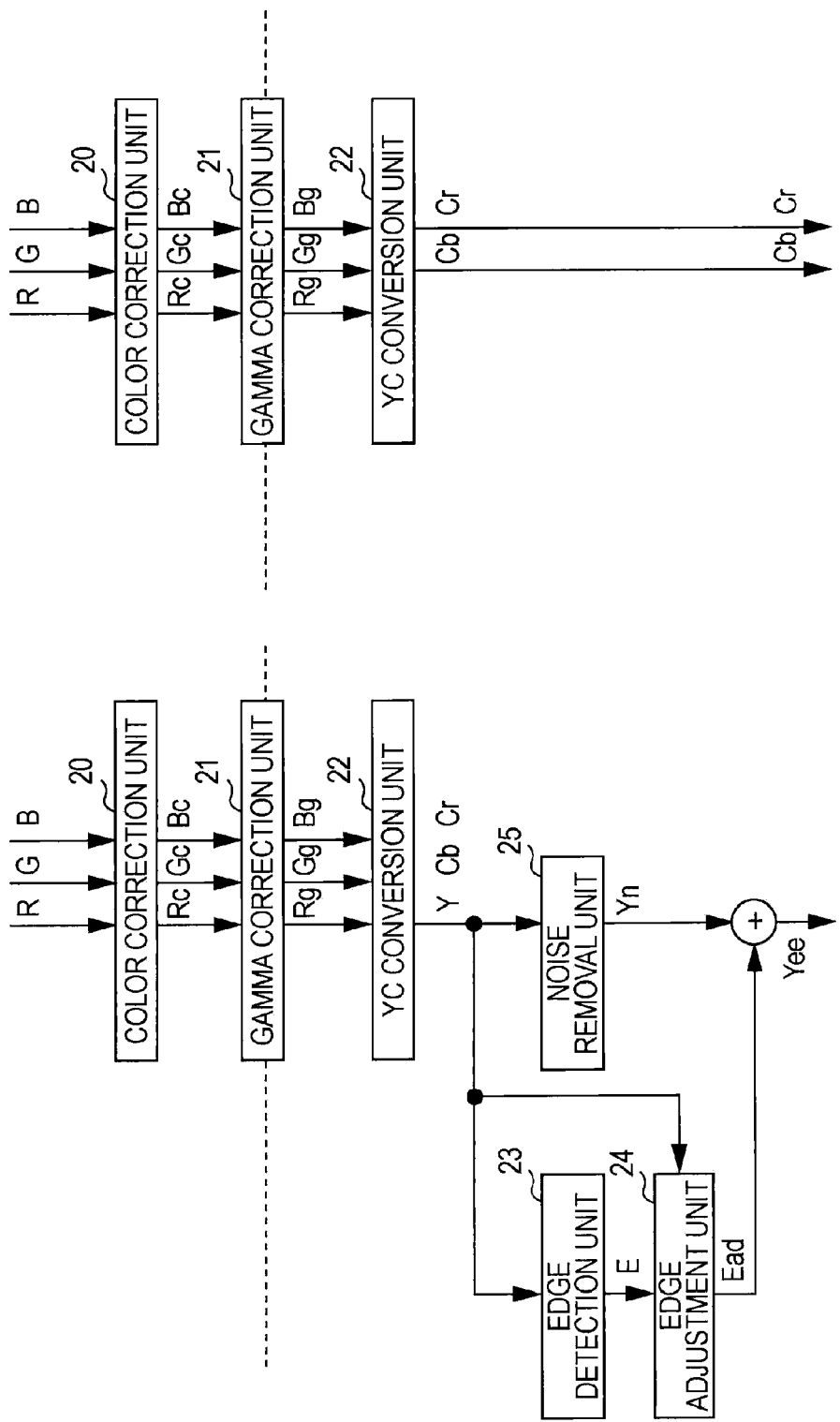
Figure 3:
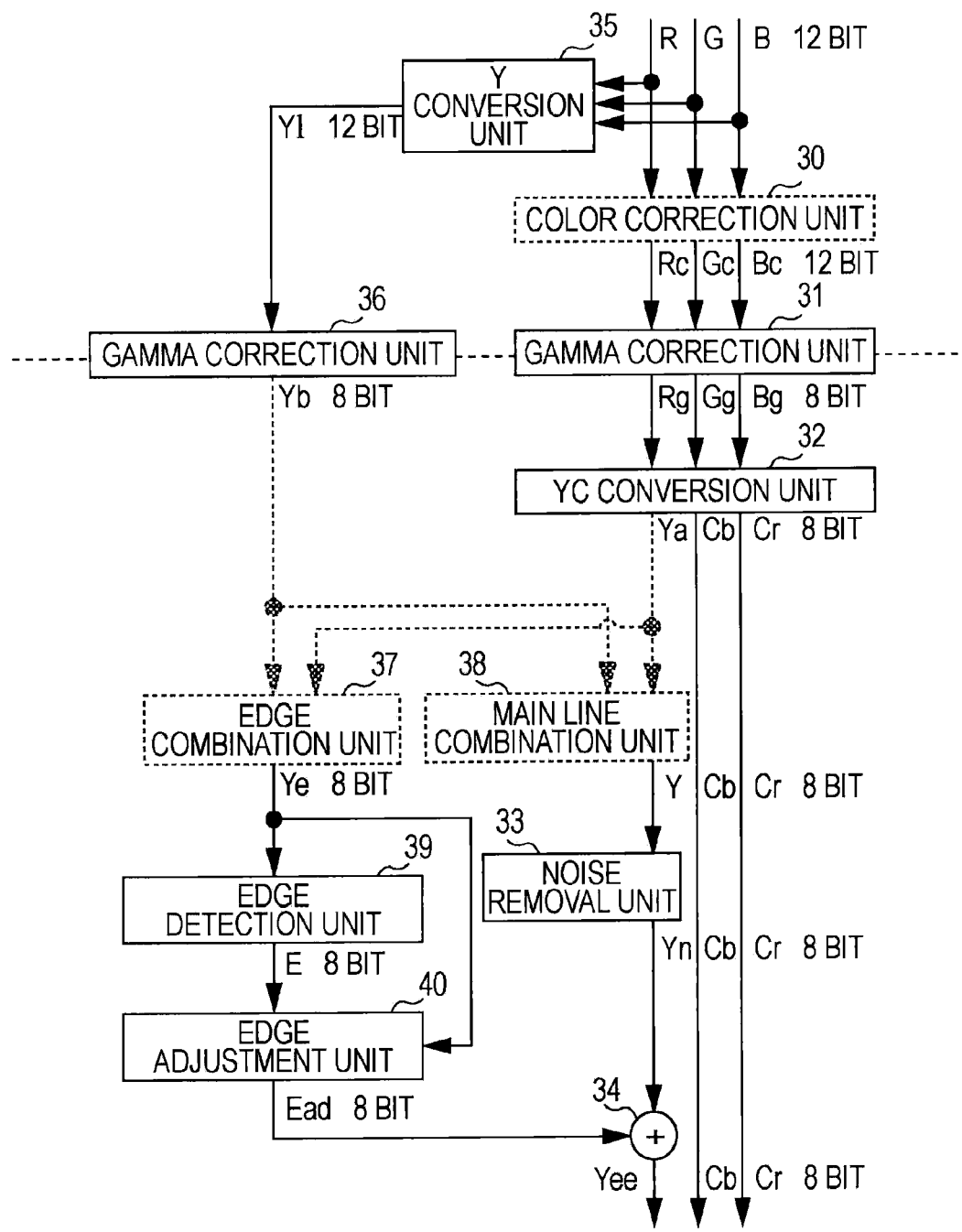
FIG. 3 illustrates an embodiment of the invention.

FIG. 3 illustrates an embodiment of the invention. In FIG. 3, a path passing through a color correction unit 30, a gamma correction unit 31, and a YC conversion unit 32 is referred to as a main line path, and a path passing through a Y conversion unit 35 and a gamma correction unit 36 is referred to as an edge emphasis path. On the main line path side, inputted RGB signals are color-corrected at the color correction unit 30 to generate Rc, Gc, and Bc signals. These signals are gamma-corrected at the gamma correction unit 31 to generate Rg, Gg, and Bg signals. The Rg, Gg, and Bg signals are referred to as gamma-corrected RGB signals. Further, these signals are converted into a luminance signal Ya and color-difference signals Cb and Cr at the YC conversion unit 32. On the other hand, on the edge emphasis path side, a luminance signal Yl is generated at the Y conversion unit 35 from the inputted RGB signals. The luminance signal Yl is gamma-corrected at the gamma correction unit 36 to generate a luminance signal Yb. Then, on the main line path side, the signal Ya is combined with the signal Yb of the edge emphasis path side at a main line combination unit 38 to generate a signal Y. The signal Y is subjected to a noise removal process at a noise removal unit 33 to generate a signal Yn. On the other hand, on the edge emphasis path side, the signal Yb is combined with the signal Ya at an edge combination unit 37 to generate a signal Ye. An edge detection signal E is generated at an edge detection unit 39 from the signal Ye. Adjustment such as removal of a noise component is performed at an edge adjustment unit 40 on the edge detection signal E, to generate a signal Ead. The signal Ead is added to the signal Yn at an adder 34 to generate a luminance signal Yee. The signal Ead is referred to as an edge-adjusted signal. The signals Yee, Cb, and Cr are outputted as final signals.

Figures 4, 5:
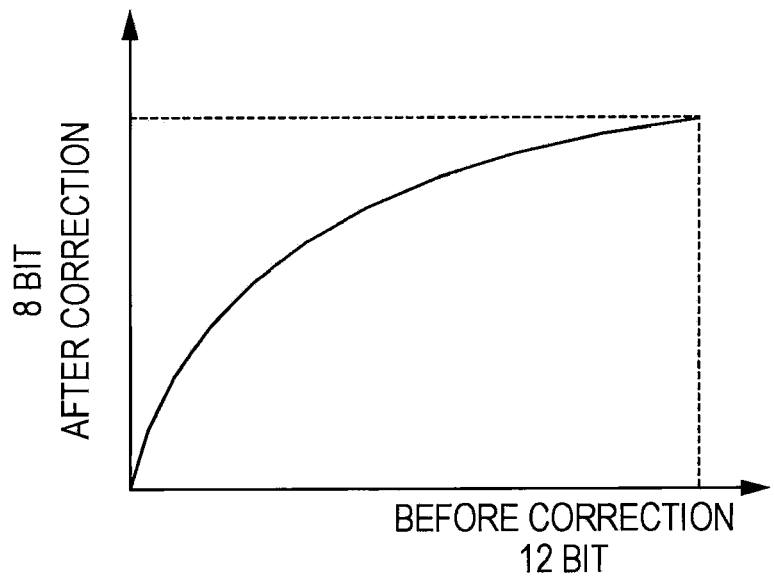
FIG. 4 is a graph illustrating contents of a gamma correction table in the embodiment.
FIG. 5 illustrates an example of a Laplacian filter in the embodiment.

FIG. 4 is a graph illustrating contents of a gamma correction table. The following will describe in detail a process of the present embodiment. At the color correction unit 30, the R, G, and B signals are color-corrected to generate the Rc, Gc, and Bc signals based on the following matrix operation.

$$\begin{pmatrix} Rc \\ Gc \\ Bc \end{pmatrix} = \begin{pmatrix} CC00 & CC01 & CC02 \\ CC10 & CC11 & CC12 \\ CC20 & CC21 & CC22 \end{pmatrix} \begin{pmatrix} R \\ G \\ B \end{pmatrix}$$

At the gamma correction unit 31, the Rc, Gc, and Bc signals are gamma-corrected. The gamma correction table includes numerical values that represent the graph illustrated in FIG. 4. In the gamma correction table GTbl[x], x denotes inputted data. As illustrated in FIG. 4, for example, inputted data that has not been gamma-corrected is 12-bit data, and outputted data that has been gamma-corrected is 8-bit data. Rg equals GTbl[Rc], Gg equals GTbl[Gc], and Bg equals GTbl[Bc].

Then, the Rg, Gg, and Bg signals are YC-converted based on the following matrix operation.

$$\begin{pmatrix} Ya \\ Cb \\ Cr \end{pmatrix} = \begin{pmatrix} YC00 & YC01 & YC02 \\ YC10 & YC11 & YC12 \\ YC20 & YC21 & YC22 \end{pmatrix} \begin{pmatrix} Rg \\ Gg \\ Bg \end{pmatrix}$$

This is the process on the main line path side.

In the edge emphasis path, at the Y conversion unit 35, the luminance signal Yl is generated from the R, G, and B signals that have not been gamma-corrected. The conversion is performed based on the following formula.

$$Yl = kr*R + kg*G + kb*B$$

The values of the coefficients kr, kg, and kb are the values of matrix elements, in a YC conversion matrix, which is used for conversion into a luminance signal. For example, kr is 0.3, kg is 0.59, and kb is 0.11.

At the gamma correction unit 36, the luminance signal Yl is gamma-corrected.

$$Yb = GTbl[Yl]$$

The luminance Yb obtained after the gamma correction and the signal Ya obtained after the YC conversion are combined to obtain the luminance signal Ye for edge detection and the luminance signal Y of the main line path.

$$Ye = YEBLEND*Yb + (1-YEBLEND)Ya$$

$$Y = YYBLEND*Ya + (1-YYBLEND)Yb$$

Here, YBBLEND and YABLEND are set to be in a range from 0 to 1.0. When the luminance Yb obtained after the gamma correction and the signal Ya obtained after the YC conversion are not combined, YEBLEND and YYBLEND are set to be 1.0. The luminance Ye is edge-detected to obtain the edge component E.

$$E = \text{Laplacian filter[luminance Ye]}$$

FIG. 5 illustrates an example of a Laplacian filter. In FIG. 5, c is 4*(a+b), and a is 1.0 and b is 1.0 as an example of a setting of a and b. The Laplacian filter in FIG. 5 has a structure of 3×3, but may be larger.

The edge component E is adjusted at the edge adjustment unit 40 to generate the edge component Ead. For example, the edge adjustment is as follows.

$$Ead1 = E - Cor, \text{ where } +Cor < E.$$

$$Ead1 = 0, \text{ where } -Cor \leq E \leq +Cor.$$

$$Ead1 = E + Cor, \text{ where } E < -Cor.$$

Here, Cor is a coring threshold parameter. The coring threshold parameter is set in order to remove, as noise, an edge of the edge component E that has an intensity amplitude less than the coring threshold parameter Cor. Thus, the edge has an intensity amplitude greater than the coring threshold parameter Cor. The coring threshold parameter Cor may be changed in accordance with the luminance Ye or the luminance Y.

A process represented by the following formula is performed.

$$Ead = Ead1 \times Scl$$

Here, Scl is a scale parameter. The process of multiplying Ead1 by the scale parameter Scl adjusts a degree of emphasizing an edge component. The greater the scale parameter Scl is, the higher the emphasizing degree is. The lower the scale parameter Scl is, the lower the emphasizing degree is. The scale parameter Scl may be changed in accordance with the luminance Yg or the luminance Y.

The luminance Y obtained after the YC conversion is subjected to a noise reduction process at the noise removal unit 33 to generate the luminance Yn. The adjusted edge component Ead is added to the luminance Yn to obtain the edge-emphasized luminance Yee.

$$Yee = Yn + Ead$$

When Yee is an unsigned 8-bit integer, Yee is clipped so as to be in a range from 0 to 255.

The present embodiment has functions of main line combination and edge combination. The luminance signals Ya and Yb used for combination are characterized as follows.

Luminance signal Ya:
(a) Noise increases when color correction is performed to a high degree; and
(b) Color reproducibility is excellent.

Luminance signal Yb:
(a) Noise may be suppressed because the luminance signal Yb is generated by Y-converting the RGB signals that have not been color-corrected; and
(b) Color reproducibility is poor.

The characteristics of the luminance signals Ya and Yb lead to the following for main line combination and edge combination.

[Main Line Combination]

When the ratio of the luminance signal Ya is increased, color reproducibility is excellent but noise is likely to be mixed in.

When the ratio of the luminance signal Ya is decreased, noise is reduced but color reproducibility deteriorates.

[Edge Combination]

When the ratio of the luminance signal Ya is increased, it becomes easy to perform adjustment of edge emphasis but noise is likely to be mixed in because the color-corrected luminance Y may be directly adjusted.

When the ratio of the luminance signal Ya is decreased, noise is reduced but it becomes difficult to perform adjustment of edge emphasis.

A factor of amplifying noise, included in the present embodiment, is divided into two factors.

Noise amplifying factor A: Noise that occurs when the color separation of an imaging device is poor and color correction is performed to a high degree.

Noise amplifying factor B: Noise that occurs when ISO sensitivity (AGC gain) of an analog front end is increased in the case where a dark subject is photographed, in the case where a shutter time is desired to be shortened, or in the case where an aperture is made to be smaller in diameter for increasing the depth of a subject.

In the present embodiment, it is possible to take measures against the above two noise amplifying factors as described below. The present embodiment has a function of adjusting the ratio of the luminance signals Ya and Yb for main line combination and edge combination, in accordance with a case where noise does not almost occur, a case where the noise amplifying factor A exists, or a case where the noise amplifying factor B exists. The following will describe an adjustment method.

Case where the color separation of the imaging device is excellent (case where noise does not almost occur).

When the color separation of the imaging device is excellent and color correction is performed to a low degree, noise is unlikely to be mixed in the luminance signal Ya. Thus, it is only necessary to increase the luminance signal Ya for both main line combination and edge combination. By so doing, the final luminance signal Y may be directly adjusted, and hence it is easy to perform adjustment of edge emphasis.

Further, when the luminance signal Ya is increased for both main line combination and edge combination, color correction may be performed to a high degree. When color correction is performed to a low degree, the effect of a false outline and/or noise may be suppressed.

Case where the color separation of the imaging device is poor (noise amplifying factor A).

When the color separation of the imaging device is poor and color correction is performed to a high degree, noise is likely to be mixed in. Thus, an adjustment method for reducing noise will be described. In the edge emphasis path, a small, unsmooth component is increased and added. Thus, the effect of noise is greater in the edge emphasis path than in the main line path. Thus, if the noise is great when the noise of an outputted image is checked, the ratio of the luminance signal Ya for edge combination is decreased to reduce the effect of noise.

When the noise reduction effect is small even by so doing, color reproducibility is sacrificed, and the ratio of the luminance signal Ya for main line combination is decreased to reduce the effect of noise. For the noise amplifying factor A, adjustment is performed in accordance with the optical system of the camera. In other words, adjustment is performed at a stage of development of the camera.

Case where ISO sensitivity is increased (noise amplifying factor B).

When the ISO sensitivity is increased, noise increases. In accordance with the increase in noise, adjustment is performed similarly as in the case where the color separation of the imaging device is poor. The noise amplifying factor B changes dynamically in accordance with the ISO sensitivity (AGC gain) when taking a photograph with the camera. Thus, adjustment is performed accordingly. However, when a photographing person or a camera designer prioritizes noise reduction over color reproducibility in the above adjustment, the ratio of the luminance signal Ya may be decreased for both main line combination and edge combination to reduce the effect of noise.

According to the above embodiment, when the luminance signal Ye is generated in edge combination, the luminance signal Yb, which is generated from the RGB signals that have not been color-corrected, may be combined. Occurrence of a false outline in the luminance signal Yb is suppressed. In addition, when the luminance signal Y is generated in main line combination, a method of combining the luminance signal Yb is provided, thereby reducing the noise of the luminance of the main line by an amount equivalent to the ratio of the luminance signal Ya. Moreover, when the luminance signal Ye is generated in edge combination, the luminance signal Yb, which is calculated from the RGB signals that have not been color-corrected, may be combined. Thus, it is possible to perform edge detection for the luminance in which noise has not increased.

Further, when the luminance signal Y is generated in main line combination, color reproducibility that complies with the standards is maintained by increasing the color-corrected luminance signal Ya. When the color separation of the imaging device is excellent, it is possible to perform edge detection also for luminance data that has been subjected to color correction, by increasing the ratio of the luminance signal Ya of the main line for edge combination. In addition, parameters may be adjusted by one piece of hardware in accordance with whether the color separation of the imaging device is excellent or poor, and image processing suitable for the sensor may be implemented. The parameters are adjusted in accordance with the amount of noise, and image processing suitable at that time may be implemented. In accordance with whether noise reduction or color reproducibility is prioritized due to a preference of a camera designer or a camera user, the parameters are adjusted, and image processing in accordance with the preference may be implemented.

Figure 6:
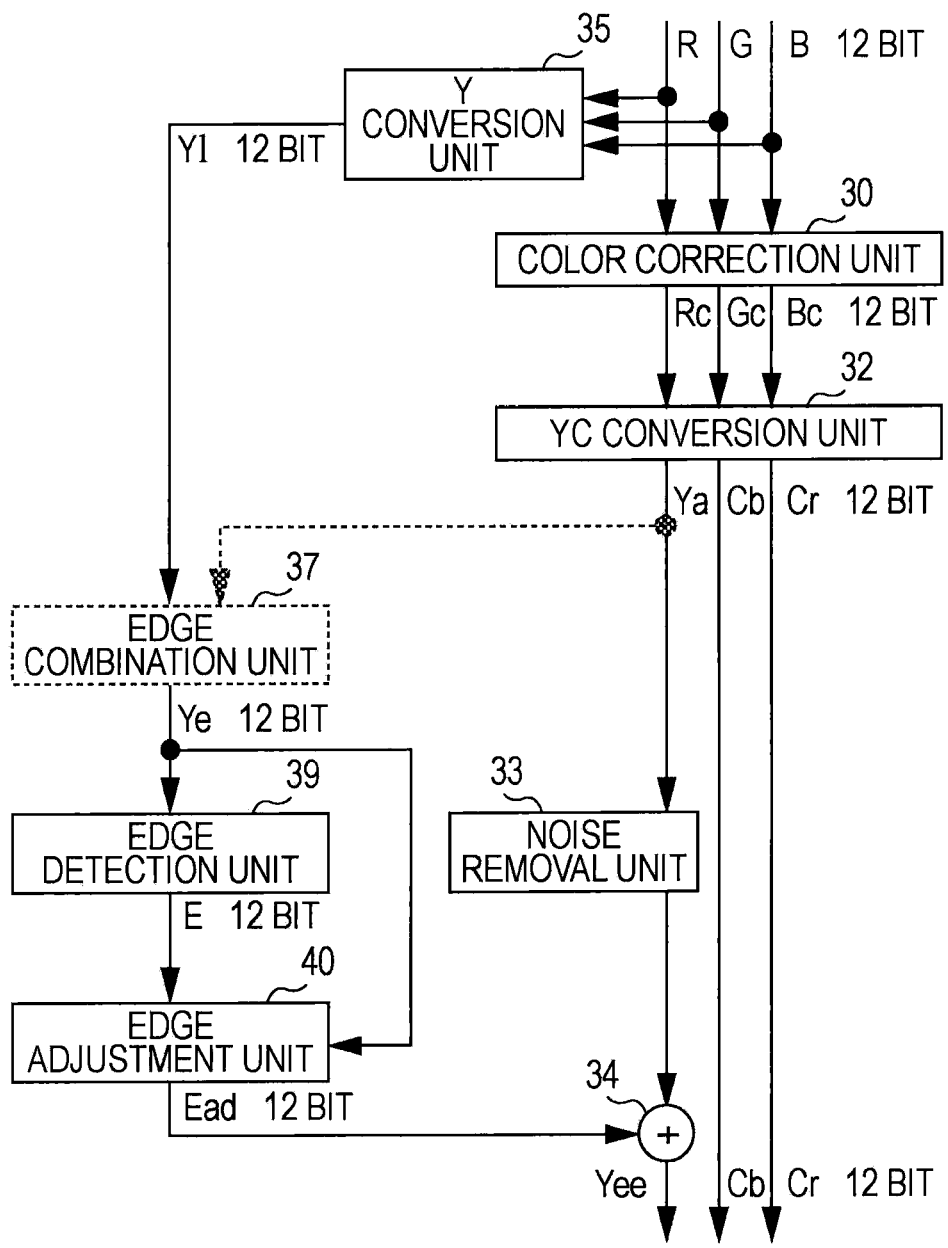
FIG. 6 illustrates a first modified example of the embodiment.

FIG. 6 illustrates a first modified example. In FIG. 6, gamma correction is not performed, and combination of luminance signals is performed on the edge emphasis path side. In FIG. 3, gamma correction is performed in order to match with color spaces (sRGB, and the like) of an output apparatus. However, when gamma correction is unnecessary in order to match with the color space of the output apparatus, gamma correction may not be performed. The RGB signals are converted into the luminance signal Yl at the Y conversion unit 35. In addition, the RGB signals are color-corrected at the color correction unit 30, and converted into the YCbCr signals at the YC conversion unit 32. The luminance signal Ya obtained after the YC conversion is combined with the luminance signal Yl at the edge combination unit 37, and subjected to edge detection and edge adjustment. The luminance signal Ya is noise-removed, and then added to the edge detection signal Ead at the adder 34.

In the modified example, when the luminance signal Ye is generated in edge combination, the luminance signal Yb, which is generated from the RGB signals that have not been color-corrected, may be combined. Occurrence of a false outline in the luminance signal Yb is suppressed, and edge emphasis of the false outline may be suppressed. In addition, when the luminance signal Ye is generated in edge combination, the luminance signal Yb, which is calculated from the RGB signals that have not been color-corrected, may be combined. Thus, it is possible to perform edge detection for the luminance in which noise has not increased. Further, when the color separation of the imaging device is excellent, it is possible to perform edge detection also for luminance data that has been subjected to color correction, by increasing the ratio of the luminance signal Ya of the main line for edge combination.

Figure 7:
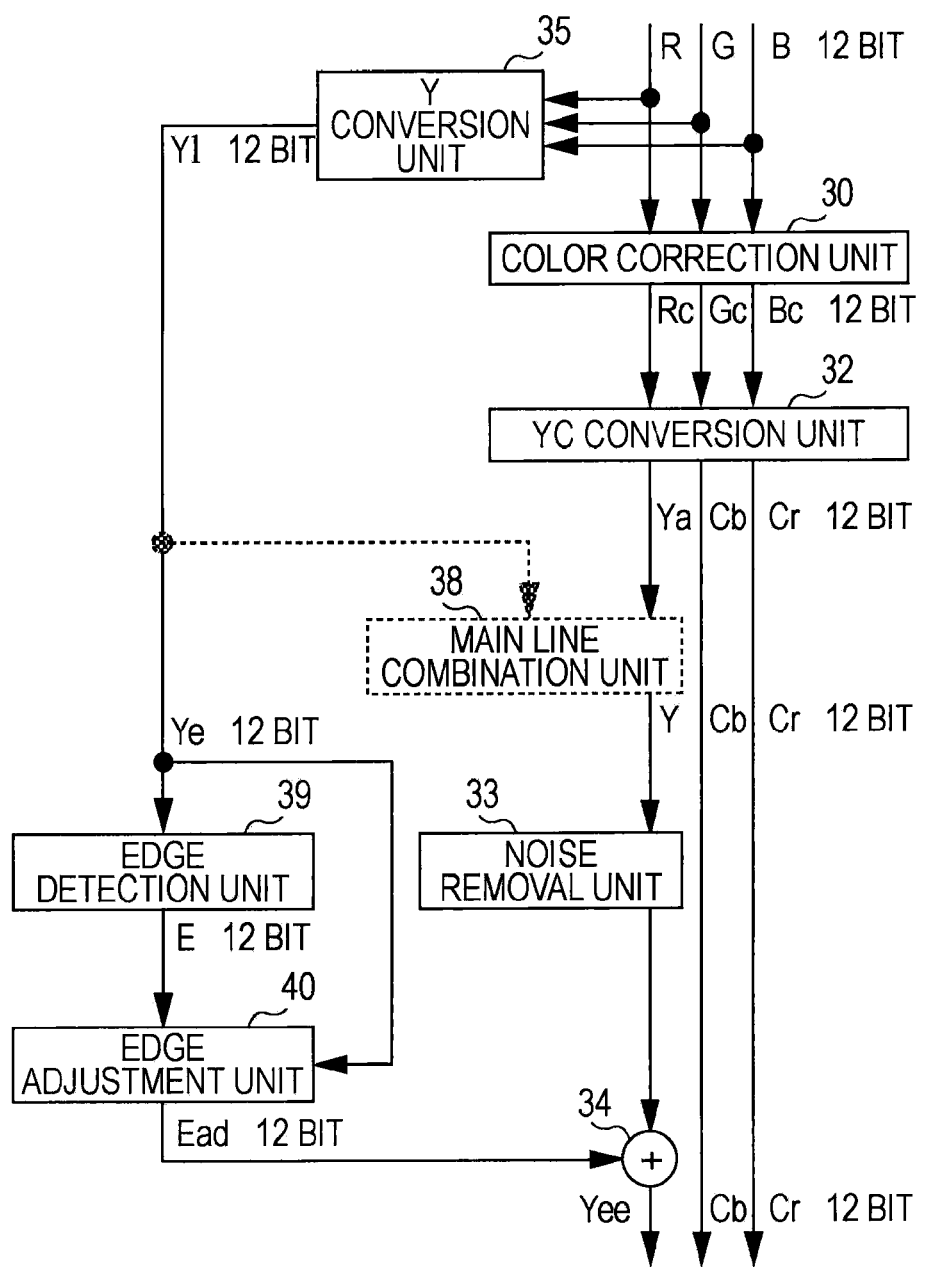
FIG. 7 illustrates a second modified example of the embodiment.

FIG. 7 illustrates a second modified example. In FIG. 7, gamma correction is not performed, and combination of luminance signals is performed on the main line path side. In FIG. 3, the 12-bit signals are converted into the 8-bit signals at the gamma correction units 31 and 36. However, when the conversion into an 8-bit signal is unnecessary, gamma correction may not be performed. The RGB signals are converted into the luminance signal Yl at the Y conversion unit 35. In addition, the RGB signals are color-corrected at the color correction unit 30, and converted into the YCbCr signals at the YC conversion unit 32. The luminance signal Ya obtained after the YC conversion is combined with the luminance signal Yl at the main line combination unit 38, noise-removed, and then added to the edge detection signal Ead at the adder 34.

In the second modified example, when the luminance signal Y is generated in main line combination, the luminance signal Yb is combined, thereby reducing the noise of the luminance of the main line. Further, when the luminance signal Y is generated in main line combination, color reproducibility that complies with the standards is maintained by increasing the color-corrected luminance signal Ya.

Figure 8:
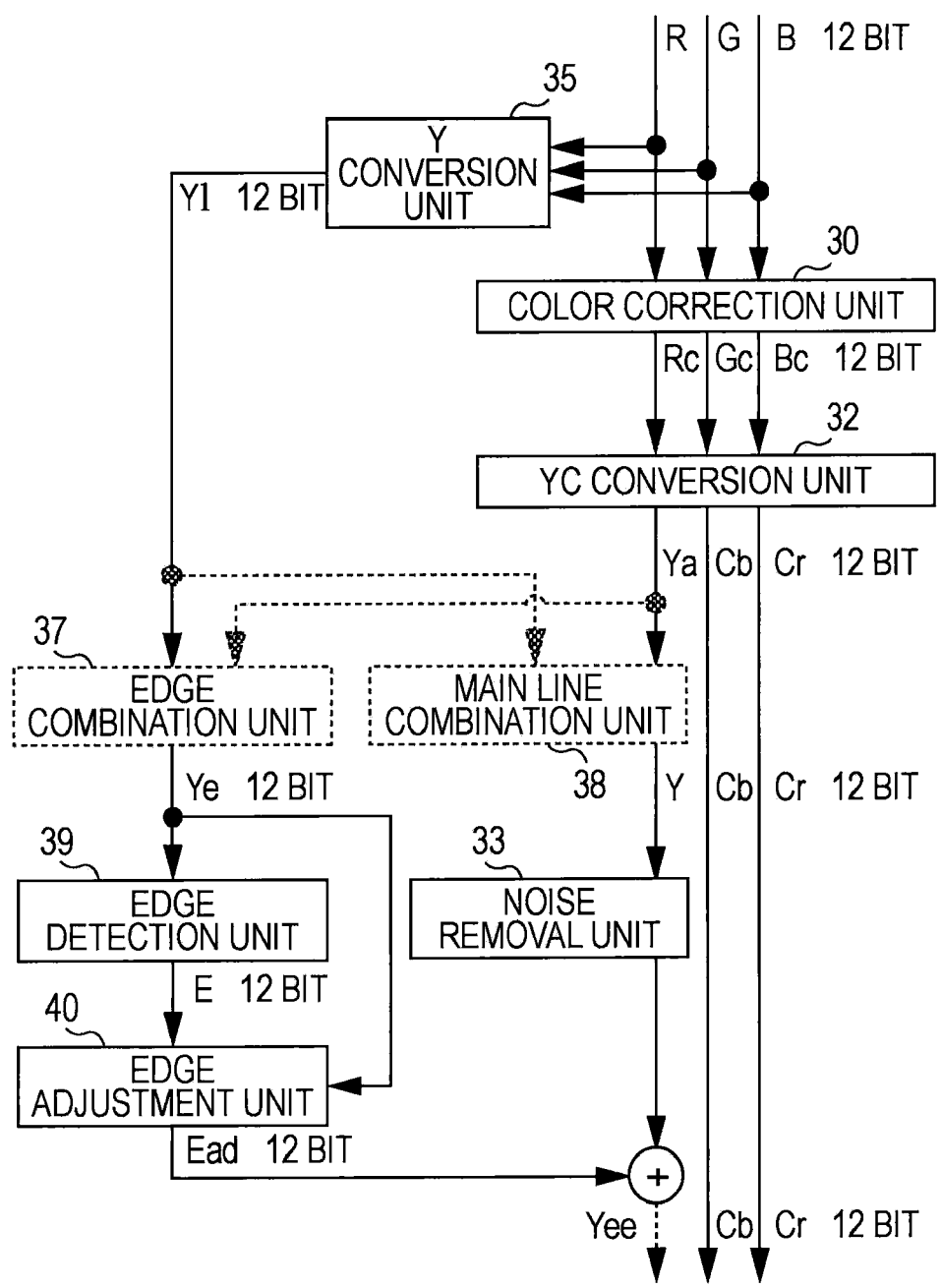
FIG. 8 illustrates a third modified example of the embodiment.

FIG. 8 illustrates a third modified example. In FIG. 8, gamma correction is not performed, and combination of luminance signals is performed both on the edge emphasis path side and on the main line path side. The RGB signals are converted into the luminance signal Yl at the Y conversion unit 35. In addition, the RGB signals are color-corrected at the color correction unit 30, and converted into the YCbCr signals at the YC conversion unit 32. The luminance signal Ya obtained after the YC conversion is combined with the luminance signal Yl at the edge combination unit 37, and subjected to edge detection and edge adjustment. In addition, the luminance signal Ya is combined with the luminance signal Yl at the main line combination unit 38, noise-removed, and then added to the edge detection signal Ead at the adder 34.

In the third modified example, when the luminance signal Ye is generated in edge combination, the luminance signal Yl, which is generated from the RGB signals that have not been color-corrected, may be combined. Occurrence of a false outline in the luminance signal Yl may be suppressed, and edge emphasis of the false outline is suppressed. In addition, when the luminance signal Y is generated in main line combination, the luminance signal Yl is combined, thereby reducing the noise of the luminance of the main line. Moreover, when the luminance signal Ye is generated in edge combination, the luminance signal Yl, which is calculated from the RGB signals that have not been color-corrected, may be combined. Thus, it is possible to perform edge detection for the luminance in which noise has not increased.

Further, when the luminance signal Y is generated in main line combination, color reproducibility that complies with the standards is maintained by increasing the color-corrected luminance signal Ya. When the color separation of the imaging device is excellent, it is possible to perform edge detection also for luminance data that has been subjected to color correction, by increasing the ratio of the luminance signal Ya of the main line in the edge combination.

Figure 9:
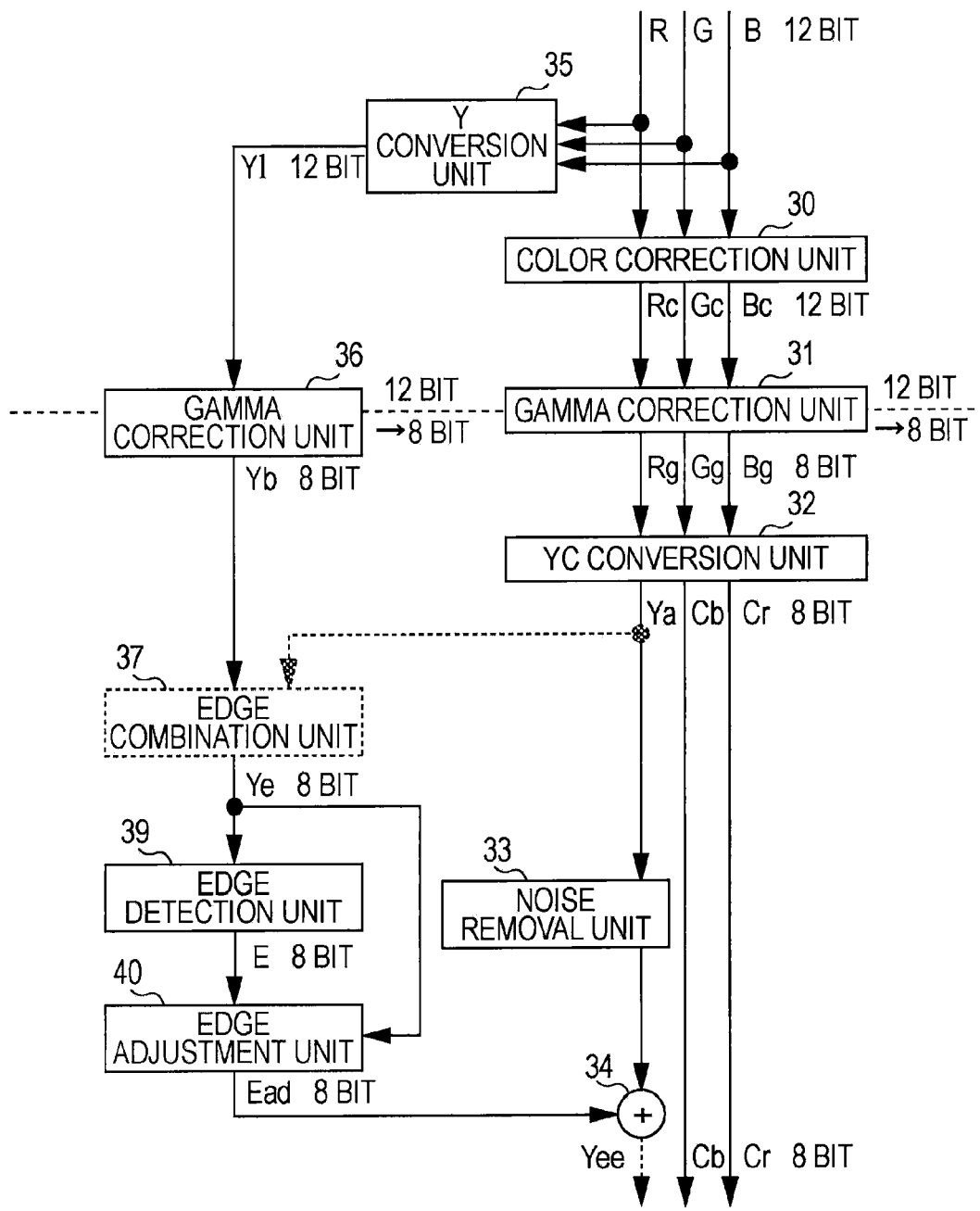
FIG. 9 illustrates a fourth modified example of the embodiment.

FIG. 9 illustrates a fourth modified example. The RGB signals are converted into the luminance signal Yl at the Y conversion unit 35. In addition, the RGB signals are color-corrected at the color correction unit 30, gamma-corrected at the gamma correction unit 31, and then converted into the YCbCr signals at the YC conversion unit 32. The luminance signal Ya obtained after the YC conversion is combined at the edge combination unit 37 with the luminance signal Yb obtained after the gamma correction, and subjected to edge detection and edge adjustment. The luminance signal Ya is noise-removed, and then added to the edge detection signal Ead at the adder 34.

In the fourth modified example, when the luminance signal Ye is generated in edge combination, the luminance signal Yb, which is generated from the RGB signals that have not been color-corrected, is combined. Occurrence of a false outline in the luminance signal Yb is suppressed, and edge emphasis of the false outline is suppressed. In addition, when the luminance signal Ye is generated in edge combination, the luminance signal Yb, which is calculated from the RGB signals that have not been color-corrected, may be combined. Thus, it is possible to perform edge detection for the luminance in which noise has not increased. Further, when the color separation of the imaging device is excellent, it is possible to perform edge detection also for luminance data that has been subjected to color correction, by increasing the ratio of the luminance signal Ya of the main line for edge combination.

Figure 10:
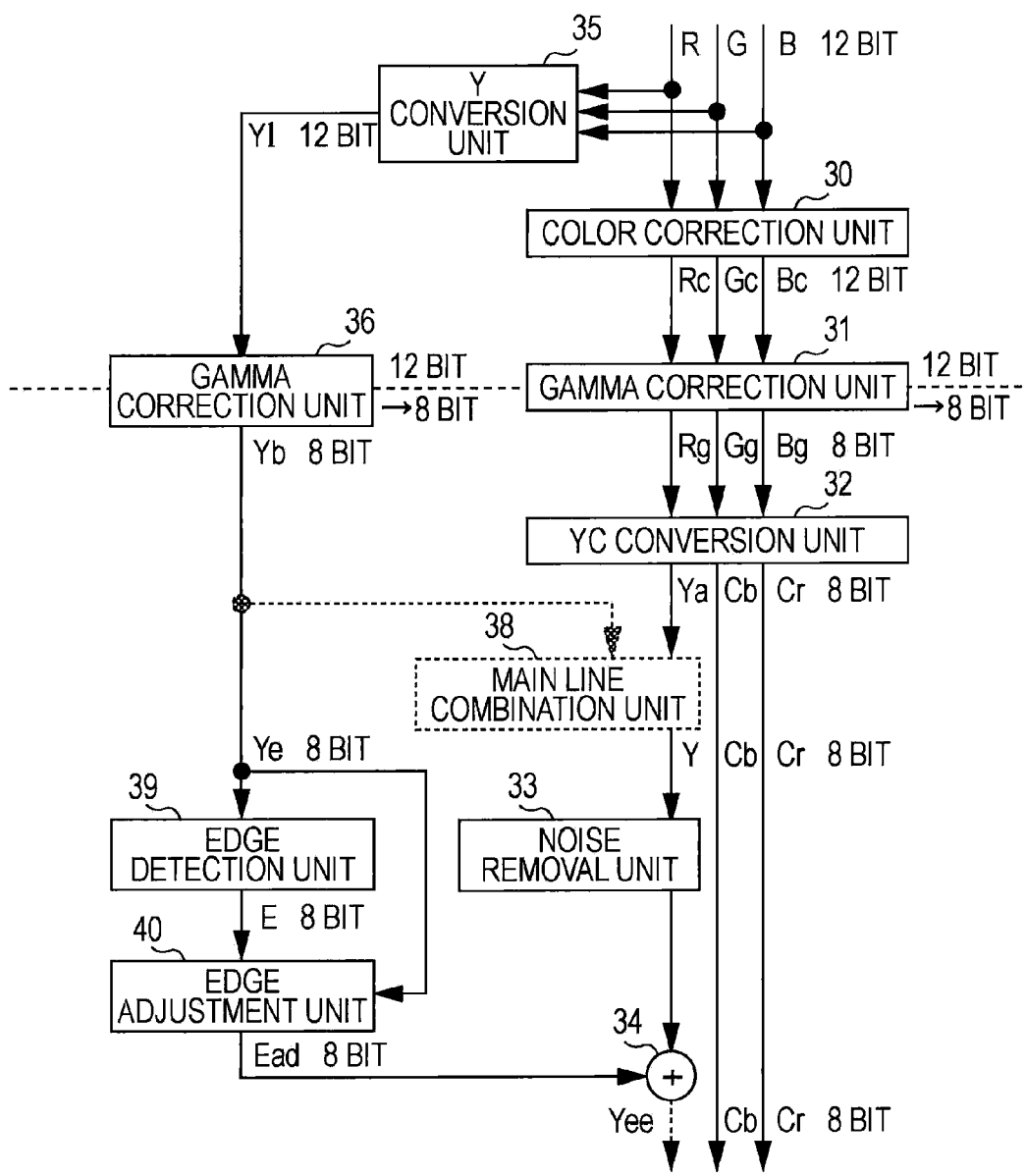
FIG. 10 illustrates a fifth modified example of the embodiment.

FIG. 10 illustrates a fifth modified example. The RGB signals are converted into the luminance signal Yl at the Y conversion unit 35. In addition, the RGB signals are color-corrected at the color correction unit 30, gamma-corrected at the gamma correction unit 31, and then converted into the YCbCr signals at the YC conversion unit 32. The luminance signal Ya obtained after the YC conversion is combined at the main line combination unit 38 with the luminance signal Yb obtained after the gamma correction, noise-removed, and then added to the edge detection signal Ead at the adder 34.

In the fifth modified example, when the luminance signal Y is generated in main line combination, the luminance signal Yb is combined, thereby reducing the noise of the luminance of the main line. Further, when the luminance signal Y is generated in main line combination, color reproducibility that complies with the standards is maintained by increasing the color-corrected luminance signal Ya.

Figure 11:
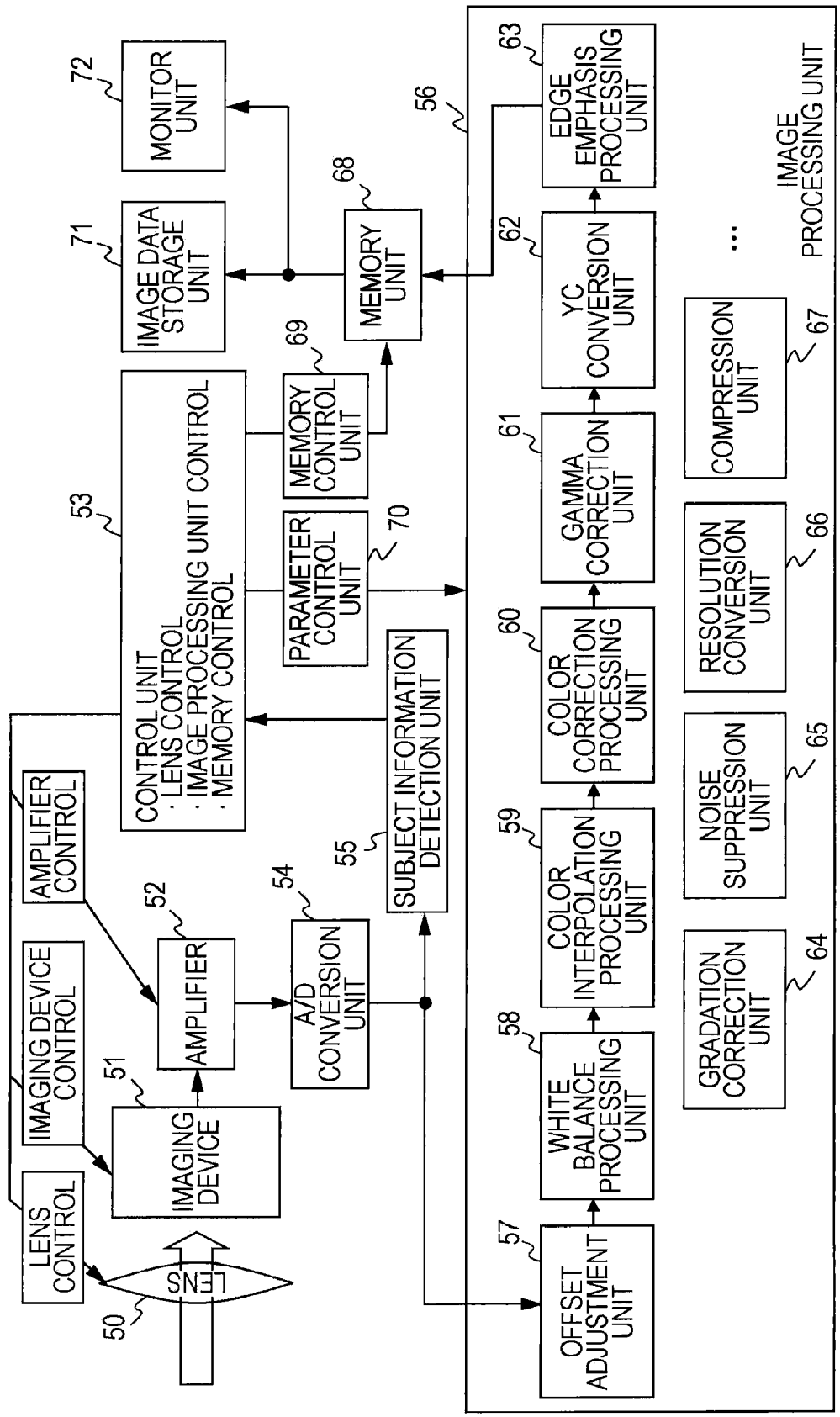
FIG. 11 is a block diagram of a digital camera.

FIG. 11 is a block diagram of a digital camera. Light incoming from a subject is converged by a lens 50, and electrically converted by an imaging device 51. The output of the imaging device 51 is amplified by an amplifier 52, converted into a digital signal by an A/D conversion unit 54, and inputted to an image processing unit 56. The lens 50, the imaging device 51, and the amplifier 52 are controlled by a control unit 53. A subject information detection unit 55 receives the output of the A/D conversion unit 54 to obtain information such as the brightness of the subject and the like, and gives the information as parameters to the control unit 53, allowing the control unit 53 to control the aperture of the lens, an exposure time, and the like.

In the image processing unit 56, an offset adjustment unit 57 receives the output from the A/D conversion unit 54, and performs adjustment of the zero point of image data. A white balance processing unit 58 adjusts the white balance of the image data, and a color interpolation processing unit 59 performs an interpolation process of color data between pixels. A color correction processing unit 60 performs color correction, and a gamma correction unit 61 performs gamma correction. A YC conversion unit 62 converts an image signal into a YC signal, and an edge emphasis processing unit 63 performs an edge emphasis process. A structure according to an embodiment of the invention is the structure from the color correction processing unit 60 to the edge emphasis processing unit 63. In addition, the image processing unit 56 includes a gradation correction unit 64, a noise suppression unit 65, a resolution conversion unit 66, and a compression unit 67, and performs correction of gradation, noise suppression, resolution conversion, compression of image data, and the like. The image processing unit 56 is controlled by the control unit 53 through a parameter control unit 70. The output of the image processing unit 56 is stored in a memory unit 68 that is controlled by the control unit 53 through a memory control unit 69, and then stored in an image data storage unit 71 or displayed on a screen by a monitor unit 72.

Figure 12:
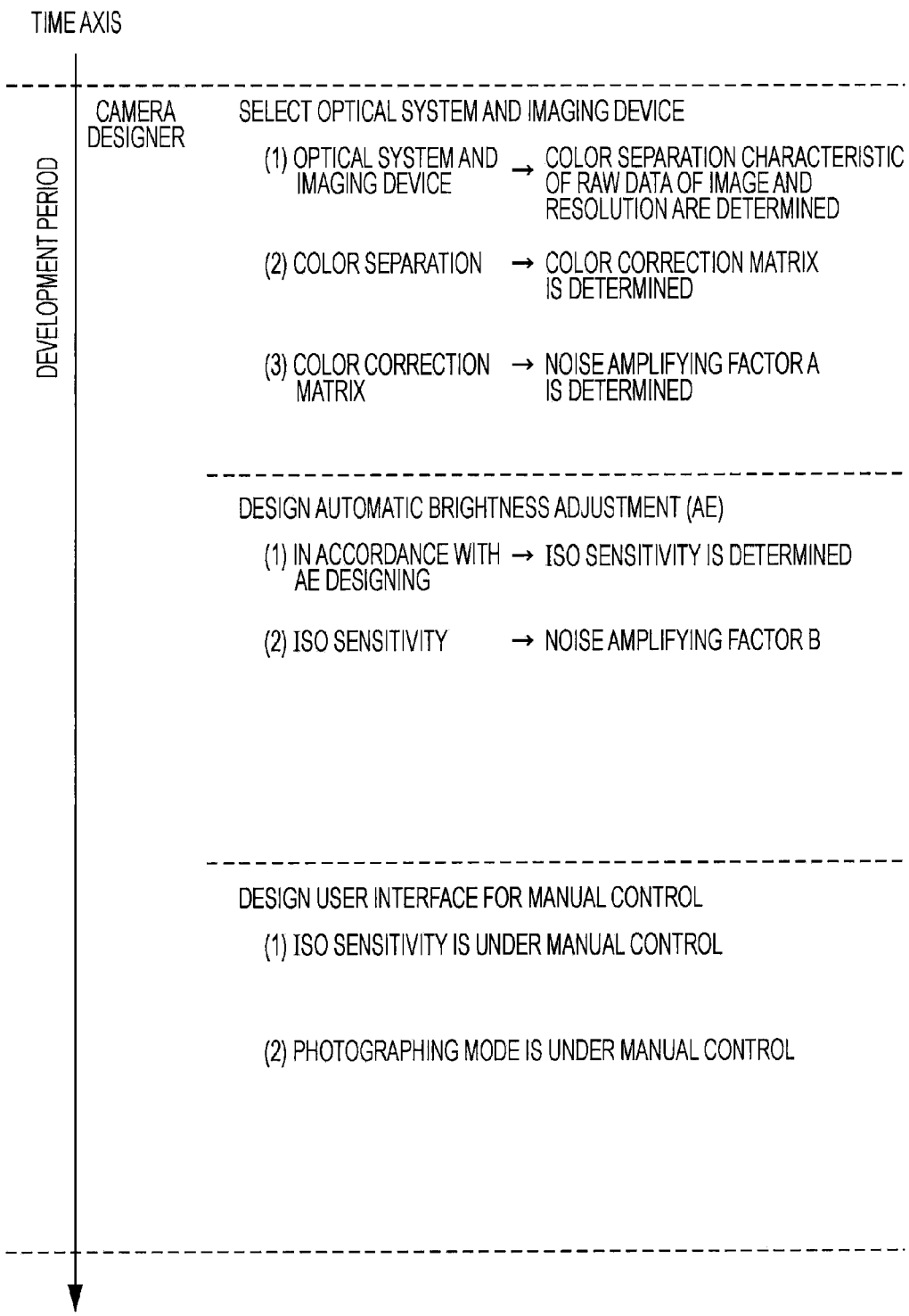
FIGS. 12 and 13 illustrate setting of a combination ratio in the embodiment during a period from development of a camera to use of the camera.
Figure 13:
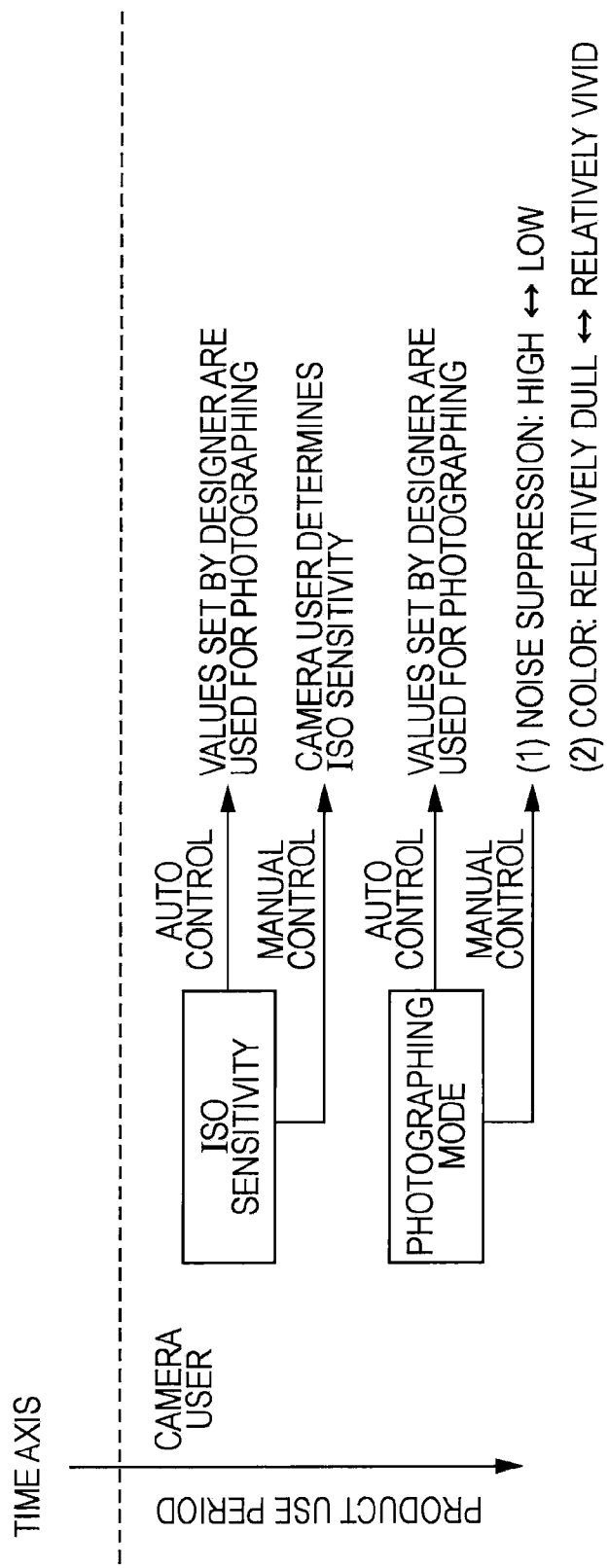

FIGS. 12 and 13 illustrate a method of setting a combination ratio in the present embodiment from development of a camera to use of the camera. During a development period of the camera, a camera designer selects an optical system and an imaging device for the camera. By selecting the optical system and the imaging device, the color separation characteristic of raw data of an image and resolution are determined. When the color separation characteristic is determined, a color correction matrix is determined.

The camera designer designs software for the control unit 53, and installs a program for setting the color correction matrix. Then, in accordance with the case where the color separation of the imaging device is excellent (when noise is only slightly amplified) or the case where the color separation of the imaging device is poor (the noise amplifying factor A), the camera designer adjusts edge combination and main line combination. Then, the camera designer designs the software for the control unit 53, and installs a program for setting edge combination and main line combination. At that time, ISO sensitivity is minimized so that the noise amplifying factor B is reduced.

The camera designer designs automatic brightness adjustment (AE). In accordance with the designing of AE, the ISO sensitivity is determined. Further, when the ISO sensitivity is determined, the noise amplifying factor B is determined. When the ISO sensitivity is increased (the noise amplifying factor B), noise increases. In accordance with the increase in noise, the camera designer adjusts edge combination and main line combination.

For example, when the ISO sensitivity is changed from 400 to 800, noise increases. Thus, the ratio of the luminance signal Ya is decreased for both edge combination and main line combination to reduce the effect of noise. Each time the ISO sensitivity is increased, the ratio of the luminance signal Ya is decreased, thereby suppressing the effect of noise.

It is noted that the camera designer considers whether to prioritize noise reduction or color reproducibility, and may determine the ratio for edge combination and main line combination. Specifically, when the camera designer prioritizes noise reduction over color reproducibility, the ratio of the luminance signal Ya may be decreased for both edge combination and main line combination to reduce the effect of noise. On the other hand, when the camera designer prioritizes color reproducibility over noise reduction, color reproducibility may be maintained by increasing the ratio of the luminance signal Ya for main line combination.

Then, the camera designer designs a user interface. When the ISO sensitivity is under manual control, the camera designer sets, in advance, the ratios for edge combination and main line combination in accordance with ISO sensitivity that is to be set by a camera user. Then, the camera designer designs software for the control unit, and installs a program. When a photographing mode is under manual control, the camera designer makes settings in advance for allowing the camera user to select the degree of noise suppression and the saturation of color, designs the software for the control unit, and installs the program.

Specifically, when the camera user sets the degree of noise suppression to be "high", the ratio of the luminance signal Ya is set to be decreased for both edge combination and main line combination, thereby suppressing noise. On the other hand, when the camera user sets the degree of noise suppression to be "low", the ratio of the luminance signal Ya is set to be increased for both edge combination and main line combination. Further, when the camera user sets color to be "relatively vivid", color correction is performed to a high degree, whereby noise increases. Thus, noise may be suppressed by setting the ratio of the luminance signal Ya to be decreased for both edge combination and main line combination.

During the period of using the camera as a product, the camera user operates the camera. When the ISO sensitivity is under automatic (Auto) control, values that are set by the designer are used for photographing. When the ISO sensitivity is under manual control, the camera user determines the ISO sensitivity. Further, when the photographing mode is under Auto control, values that are set by the designer are used for photographing. When the photographing mode is under manual control, the camera user determines the degree of noise suppression, and sets color to be relatively dull or relatively vivid.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention as set forth in the claims.

What is claimed is:

1. An image processing apparatus comprising:
a color correction circuit configured to perform color correction on RGB signals to generate color-corrected RGB signals;
a YC conversion circuit configured to convert the color-corrected RGB signals into a first luminance signal and a color-difference signal;
a Y conversion circuit configured to generate a second luminance signal based on the RGB signals;
an edge combination circuit configured to combine the first luminance signal with the second luminance signal;
an edge adjustment circuit configured to obtain an edge-adjusted signal based on a result of the combining by the edge combination unit; and
an adder configured to add the first luminance signal to the edge-adjusted signal.

2. The image processing apparatus according to claim 1, further comprising a combination circuit configured to combine the first luminance signal with the second luminance signal, wherein
the adder adds the edge-adjusted signal to the first luminance signal combined with the second luminance signal.

3. An image processing apparatus comprising:
a color correction circuit configured to perform color correction of RGB signals to generate color-corrected RGB signals;
a YC conversion circuit configured to convert the color-corrected RGB signals into a first luminance signal and a color-difference signal;
a Y conversion circuit configured to generate a second luminance signal based on the RGB signals;
a combination circuit configured to combine the first luminance signal with the second luminance signal to generate a third luminance signal;
an edge adjustment circuit configured to obtain an edge-adjusted signal based on the second luminance signal; and
an adder configured to add the third luminance signal to the edge-adjusted signal.

4. The image processing apparatus according to claim 1, further comprising:
a first gamma correction circuit configured to perform gamma correction on the color-corrected RGB signals; and
a second gamma correction circuit configured to perform gamma correction on the second luminance signal.

5. The image processing apparatus according to claim 4, wherein each of the first gamma correction circuit and the second gamma correction circuit outputs gamma-corrected RGB signals having a number of bits less than a number of bits of the RGB signals.

6. The image processing apparatus according to claim 1, wherein the edge combination circuit combines the first luminance signal with the second luminance signal, based on the following formula using a combination parameter: Combination signal=color correction matrix×times×the first luminance signal+(1−color correction matrix)×times×the second luminance signal.

7. The image processing apparatus according to claim 3, wherein the combination circuit combines the first luminance signal with the second luminance signal, based on the following formula using a combination parameter:

Combination signal=color correction matrix×times× the first luminance signal+(1−color correction matrix)×times×the second luminance signal.

8. The image processing apparatus according to claim 1, further comprising a noise removal circuit configured to perform a noise removal process on the first luminance signal and inputting the noise-removed first luminance signal into the adder.

9. An apparatus, comprising:
an imaging device configured to obtain RGB signals;
an image processing circuitry configured to:
perform color correction on the RGB signals to generate color-corrected RGB signals,
convert the color-corrected RGB signals into a first luminance signal and a color-difference signal,
generate a second luminance signal based on the RGB signals,
perform an edge combination to combine the first luminance signal with the second luminance signal,
obtain an edge-adjusted signal based on a result of the edge combination, and
add the first luminance signal to the edge-adjusted signal; and
a memory coupled to the image processing circuitry, configured to store an output of the image processing circuitry.

10. The apparatus according to claim 9, wherein the image processing circuitry is further configured to combine the first luminance signal with the second luminance signal, and wherein
the image processing circuitry adds the edge-adjusted signal to the first luminance signal combined with the second luminance signal.

11. An apparatus comprising:
an imaging device configured to obtain RGB signals;
an image processing circuitry coupled to the imaging device, configured to:
perform color correction of the RGB signals to generate color-corrected RGB signals,
convert the color-corrected RGB signals into a first luminance signal and a color-difference signal,
generate a second luminance signal based on the RGB signals,
combine the first luminance signal with the second luminance signal to generate a third luminance signal,
obtain an edge-adjusted signal based on the second luminance signal, and
add the third luminance signal to the edge-adjusted signal; and
a memory coupled to the image processing circuitry, configured to store an output of the image processing circuitry.

12. The apparatus according to claim 9, wherein the image processing circuitry is further configured to:
perform first gamma correction on the color-corrected RGB signals, and
perform second gamma correction on the second luminance signal.

13. The apparatus according to claim 12, wherein each of the first gamma correction and the second gamma correction outputs gamma-corrected RGB signals having a number of bits less than a number of bits of the RGB signals.

14. The apparatus according to claim 9, wherein the image processing circuitry combines the first luminance signal with the second luminance signal, based on the following formula using a combination parameter:

Combination signal=color correction matrix×times×
the first luminance signal+(1−color correction
matrix)×times×the second luminance signal.

15. The apparatus according to claim 11, wherein the image processing circuitry combines the first luminance signal with the second luminance signal, based on the following formula using a combination parameter:

Combination signal=color correction matrix×times×
the first luminance signal+(1−color correction
matrix)×times×the second luminance signal.

16. The apparatus according to claim 9, wherein the image processing circuitry is further configured to:
perform a noise removal process on the first luminance signal, and wherein the image processing circuitry adds the noise-removed first luminance signal to the edge-adjusted signal.

17. An image processing method, comprising:
performing color correction on RGB signals to generate color-corrected RGB signals;
converting the color-corrected RGB signals into a first luminance signal and a color-difference signal;
generating a second luminance signal based on the RGB signals;
performing an edge combination to combine the first luminance signal with the second luminance signal;
obtaining an edge-adjusted signal based on a result of the edge combination; and
adding, using an image processing circuitry, the first luminance signal to the edge-adjusted signal.

18. An image processing method, comprising:
performing color correction of the RGB signals to generate color-corrected RGB signals;
converting the color-corrected RGB signals into a first luminance signal and a color-difference signal;
generating a second luminance signal based on the RGB signals;
combining the first luminance signal with the second luminance signal to generate a third luminance signal;
obtaining an edge-adjusted signal based on the second luminance signal; and
adding, using an image processing circuitry, the third luminance signal to the edge-adjusted signal.

* * * * *